United States Patent
He et al.

(10) Patent No.: US 9,590,798 B2
(45) Date of Patent: Mar. 7, 2017

(54) SYNCHRONIZATION SYSTEM, METHOD AND MASTER/SLAVE OPTICAL MODULE DEVICE FOR DETECTING ASYMMETRY OF OPTICAL FIBERS

(71) Applicant: ZTE Corporation, Shenzhen, Guangdong (CN)

(72) Inventors: Li He, Shenzhen (CN); Hongbin Shi, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 78 days.

(21) Appl. No.: 14/646,146

(22) PCT Filed: Nov. 15, 2013

(86) PCT No.: PCT/CN2013/087279
§ 371 (c)(1),
(2) Date: May 20, 2015

(87) PCT Pub. No.: WO2014/079343
PCT Pub. Date: May 30, 2014

(65) Prior Publication Data
US 2015/0372776 A1  Dec. 24, 2015

(30) Foreign Application Priority Data

Nov. 20, 2012  (CN) .......................... 2012 1 0472244

(51) Int. Cl.
*H04L 7/00* (2006.01)
*H04B 10/073* (2013.01)
(Continued)

(52) U.S. Cl.
CPC ......... *H04L 7/0075* (2013.01); *H04B 10/073* (2013.01); *H04B 10/0795* (2013.01);
(Continued)

(58) Field of Classification Search
CPC ........................... H04B 10/073; H04L 7/0075
See application file for complete search history.

(56) References Cited

U.S. PATENT DOCUMENTS

2007/0147562 A1  6/2007  Eidson
2011/0299853 A1  12/2011 Zampetti
(Continued)

FOREIGN PATENT DOCUMENTS

| CN | 101286800 A | 10/2008 |
|---|---|---|
| CN | 101771467 A | 7/2010 |

(Continued)

OTHER PUBLICATIONS

International Search Report in international application No. PCT/CN2013/087279, mailed on Jan. 23, 2014.
(Continued)

*Primary Examiner* — David Payne
*Assistant Examiner* — Casey Kretzer
(74) *Attorney, Agent, or Firm* — Oppedahl Patent Law Firm LLC

(57) ABSTRACT

A synchronization system for detecting asymmetry of optical fibers is provided, which includes a time synchronization correction device, a time delay compensation unit and an optical module device, wherein the optical module device is configured to detect a pulse transmission time delay difference and an asymmetry distance of bidirectional optical fibers between network elements on two sides and to obtain an asymmetry time delay of the bidirectional optical fibers according to the asymmetry distance of the bidirectional optical fibers and the pulse transmission time delay difference. A synchronization method for detecting asymmetry of optical fibers is also provided, which includes obtaining an asymmetry time delay of bidirectional optical fibers according to an asymmetry distance of the bidirectional optical (Continued)

fibers and a pulse transmission time delay difference. A master optical module device and a slave optical module device for detecting asymmetry of optical fibers are also provided.

18 Claims, 3 Drawing Sheets

(51) Int. Cl.
*H04B 10/27* (2013.01)
*H04B 10/079* (2013.01)
*H04J 3/06* (2006.01)
*H04L 5/14* (2006.01)

(52) U.S. Cl.
CPC ............ *H04B 10/27* (2013.01); *H04J 3/0667* (2013.01); *H04J 3/0682* (2013.01); *H04L 5/1469* (2013.01)

(56) References Cited

U.S. PATENT DOCUMENTS

| | | | | |
|---|---|---|---|---|
| 2012/0093518 | A1* | 4/2012 | Tosetti | H04B 10/40 398/135 |
| 2013/0182244 | A1* | 7/2013 | Atkins | H04B 10/077 356/73.1 |
| 2013/0195443 | A1* | 8/2013 | Yin | H04J 3/0667 398/25 |
| 2013/0209096 | A1 | 8/2013 | Le Pallec | |
| 2014/0029933 | A1 | 1/2014 | Le Rouzic | |

FOREIGN PATENT DOCUMENTS

| | | |
|---|---|---|
| CN | 102201983 A | 9/2011 |
| CN | 102271019 A | 12/2011 |
| CN | 102291178 A | 12/2011 |
| CN | 102412955 A | 4/2012 |
| EP | 1802014 A1 | 6/2007 |
| FR | 2965131 A1 | 3/2012 |
| FR | 2971108 A1 | 8/2012 |

OTHER PUBLICATIONS

English Translation of the Written Opinion of the International Search Authority in international application No. PCT/CN2013/087279, mailed on Jan. 23, 2014.

Supplementary European Search Report in European application No. 13857622.8, mailed on Nov. 16, 2015.

* cited by examiner

SYNCHRONIZATION SYSTEM, METHOD AND MASTER/SLAVE OPTICAL MODULE DEVICE FOR DETECTING ASYMMETRY OF OPTICAL FIBERS

TECHNICAL FIELD

The disclosure relates to a time synchronization technology, and in particular to a synchronization system and method and master optical module device and slave optical module device for detecting asymmetry of optical fibres.

BACKGROUND

Due to a requirement of a Time Division Duplexing (TDD) service on a time technology, synchronous-Ethernet-based implementation of 1588 protocol gradually becomes a mainstream time synchronization technology in the communication industry.

However, a 1588 time synchronization technology theoretically depends on bidirectional symmetry of a middle path transmission delay between synchronization nodes, but bidirectional asymmetry exists in an existing network, that is, there exists a phenomenon of bidirectional length asymmetry caused by multiple reasons such as an optical cable fibre core error, an optical cable construction connection error, an optical cable failure connection error and a tail fibre error, thereby causing the transmission delay bidirectional asymmetry. Existing network data shows that it is highly probable that a time error caused by optical fibre asymmetry is more than 100 ms, therefore the asymmetry problem cannot be ignored during the construction of a time network.

At present, methods for an operating company to solve the asymmetry problem during time network deployment mainly include a 1588 testing instrument-based method, an optical fibre changeover method, a single-fibre bidirectional transmission method, an automatic ring network testing method and the like, but the methods have respective defects. The 1588 testing instrument-based method requires point-by-point compensation during network construction, and it is difficult to meet a network construction requirement of nodes in a large range; the method of realizing optical fibre changeover through an optical switch is difficult to compatible with existing device, and service damage may be caused during changeover; the single-fibre bidirectional transmission method has multiple problems about user habits and convenience in use; and the automatic ring network testing method is limited in adaptability, and can only make an error judgment about a constructed time network. The abovementioned methods for the existing network have respective defects, causing compensation for asymmetry caused by the 1588 time synchronization technology to become a problem urgent to be solved by the industry, which seriously influences the network deployment of time synchronization for a wireless TDD service.

The physical calculation of a difference between double optical fibres by measuring the distance between the optical fibres becomes a realistic solution direction. One solution is to constitute a distance measurement system by Rayleigh scattering and backscattering formed by Fresnel reflection during the transmission of optical pulses in the optical fibres through an Optical Time Domain Reflectometry (OTDR) technology; however, the OTDR technology involves long-distance measurement, and is high in measurement time and execution complexity, thereby causing slow response and further causing poor accuracy and reliability, and moreover, it is difficult to integrate the OTDR technology into an optical module.

SUMMARY

In view of this, the embodiment of the disclosure provide a synchronization system, method, a master optical module device and a slave optical module device for detecting asymmetry of optical fibres, to reduce detection time, lower execution complexity, quicken response and improve detection accuracy.

In order to achieve the purpose, the technical solutions of the embodiments of the disclosure are implemented as follows.

A synchronization system for detecting asymmetry of optical fibres includes a time synchronization correction device and a time delay compensation unit, the system further includes an optical module device, wherein the optical module device is configured to detect a pulse transmission time delay difference and an asymmetry distance of bidirectional optical fibres between network elements on two sides, to obtain an asymmetry time delay of the bidirectional optical fibres according to the asymmetry distance of the bidirectional optical fibres and the pulse transmission time delay difference, and to feed back the asymmetry time delay of the bidirectional optical fibres to the time synchronization correction device through the time delay compensation unit; and the time synchronization correction device is configured to obtain a time compensation value to correct system time to realize time synchronization for optical fibre asymmetry according to the asymmetry time delay of the bidirectional optical fibres and a timestamp of a protocol packet.

A pulse asymmetry detection unit, may be integrated into the optical module device, and may be configured to realize detection in a pulse distance measurement manner.

The pulse asymmetry detection unit may be further configured to finish detection negotiation between the network elements on the two sides under the condition that detection is realized, and to switch service data processing in a normal working state into pulse signal processing in an asymmetry detection state, wherein a pair of Bidirectional Optical Sub-Assemblies (BOSA) of the network element on one side are switched into a sending mode to send two pulse signals, and a pair of BOSAs of the network element on the other side are switched into a receiving mode to obtain the pulse transmission time delay difference and the asymmetry distance of the bidirectional optical fibres according to the two received pulse signals.

The pulse asymmetry detection unit may be further configured to terminate the detection between the network elements on the two sides, and to switch pulse signal processing in the asymmetry detection state back into service data processing in the normal working state.

A synchronization method for detecting asymmetry of optical fibres includes:

detecting a pulse transmission time delay difference and an asymmetry distance of bidirectional optical fibres between network elements on two sides;

obtaining an asymmetry time delay of the bidirectional optical fibres according to the asymmetry distance of the bidirectional optical fibres and the pulse transmission time delay difference; and obtaining a time compensation value to correct system time to realize time synchronization for optical fibre asymmetry according to the asymmetry time delay of the bidirectional optical fibres and a timestamp of a protocol packet.

The step of detecting the asymmetry distance of the bidirectional optical fibres and the pulse transmission time delay difference between the network elements on the two sides may include:

finishing detection negotiation between the network elements on the two sides, and switching service data processing in a normal working state into pulse signal processing in an asymmetry detection state; and switching a pair of BOSAs of the network element on one side into a sending mode to send two pulse signals, and switching a pair of BOSAs of the network element on the other side into a receiving mode to obtain the pulse transmission time delay difference and the asymmetry distance of the bidirectional optical fibres according to the two received pulse signals.

The method may further include terminating detection between the network elements on the two sides, and switching pulse signal processing in the asymmetry detection state back into service data processing in the normal working state.

A master optical module device for detecting asymmetry of optical fibres includes a pair of BOSAs, wherein the master optical module device is configured to set the BOSAs into a sending mode to send two pulse signals and to provide the two pulse signals for a slave optical module device to detect a pulse transmission time delay difference and an asymmetry distance of bidirectional optical fibres under the condition that asymmetry detection is started after detection negotiation is finished, and to start monitoring to detect a signal returned by the slave optical module device after the pulse signals are sent, to receive an asymmetry detection termination pulse signal sent by the slave optical module device, and to terminate the asymmetry detection.

The BOSAs are respectively a RX_BOSA configured to receive service data in a normal working state and a TX_BOSA configured to send service data in the normal working state.

Under the condition that the asymmetry detection is started, the normal working state is switched to an asymmetry detection state, the TX_BOSA may be configured to send a pulse signal, and the RX_BOSA may be configured to send a pulse signal.

Each BOSA may further include a semiconductor Laser Diode (LD) and a Photoelectron Detector (PD).

The master optical module device may further include a pulse generator and an LD driver, which are connected with each other, wherein the pulse generator is further connected with the LD of the RX_BOSA, and the pulse generator is configured to generate the pulse signal and send the pulse signal to the LD of the RX_BOSA and the LD driver; and the LD driver is configured to drive the LD of the TX_BOSA and forward the pulse signal generated by the pulse generator.

The PD of the RX_BOSA may be configured to start monitoring after the pulse signal is sent, and to detect the signal returned by the slave optical module device.

The master optical module device may further include a pulse detection controller and a pulse receiver, wherein the pulse detection controller is connected with a pulse sender, and is configured to control pulse signal sending of the pulse sender; and the pulse receiver is configured to receive the signal returned by the slave optical module device.

A slave optical module device for detecting asymmetry of optical fibres includes a pair of BOSAs, wherein the slave optical module device is configured to set the BOSAs into a receiving mode to receive two pulse signals sent by a master optical module device under the condition that asymmetry detection is started after detection negotiation is finished, to detect an asymmetry distance of bidirectional optical fibres and a pulse transmission time delay difference according to the pulse signals, and to externally output the asymmetry distance of the bidirectional optical fibres and the pulse transmission time delay difference, and to terminate the asymmetry detection and to send an asymmetry detection termination pulse signal to the master optical module device.

The BOSAs are respectively a RX_BOSA configured to receive service data in a normal working state and a TX_BOSA configured to send service data in the normal working state.

Under the condition that the asymmetry detection is started, the normal working state is switched to an asymmetry detection state, the TX_BOSA is configured to receive a pulse signal, and the RX_BOSA is configured to receive a pulse signal.

Each BOSA may further include an LD and a PD; the slave optical module device may further include a first pulse detector, a pulse counter and a second pulse detector, which are in a connection relationship;

the PD of the RX_BOSA is configured to receive the pulse signal and send the pulse signal to the first pulse detector;

the PD of the TX_BOSA is configured to receive the pulse signal and send the pulse signal to the second pulse detector;

the first pulse detector is configured to send the pulse signal to the pulse counter;

the second pulse detector is configured to send the pulse signal to the pulse counter; and the pulse counter is configured to start counting when the pulse signal is a first pulse signal, to stop counting when the pulse signal is a second pulse signal, and to output the pulse transmission time delay difference.

The slave optical module device may further include a pulse generator and an LD driver, which are connected with each other; wherein the pulse generator is configured to generate the asymmetry detection termination pulse signal when the asymmetry detection is terminated, and to send the asymmetry detection termination pulse signal to the LD driver; and the LD driver is configured to drive the LD of TX_BOSA, and to forward the asymmetry detection termination pulse signal generated by the pulse generator.

The system according to the embodiment of the disclosure includes the time synchronization correction device, the time delay compensation unit and the optical module device; the optical module device is configured to detect the pulse transmission time delay difference and the asymmetry distance of the bidirectional optical fibres between the network elements on the two sides, to obtain the asymmetry time delay of the bidirectional optical fibres according to the asymmetry distance of the bidirectional optical fibres and the pulse transmission time delay difference, and to feed back the asymmetry time delay of the bidirectional optical fibres to the time synchronization correction device through the time delay compensation unit; and the time synchronization correction device is configured to obtain the time compensation value to correct the system time to realize time synchronization for optical fibre asymmetry according to the asymmetry time delay of the bidirectional optical fibres and the timestamp of the protocol packet.

By the embodiments of the disclosure, the pulse transmission time delay difference and the asymmetry distance of the bidirectional optical fibres between the network elements on the two sides are detected, the asymmetry time delay of the bidirectional optical fibres is obtained according to the asymmetry distance of the bidirectional optical fibres and the pulse transmission time delay difference, and the asymmetry time delay of the bidirectional optical fibres is fed back to the time synchronization correction device for processing through the time delay compensation unit, so that detection time can be reduced, execution complexity can be lowered, response can be quickened, and detection accuracy can be improved.

DETAILED DESCRIPTION

Figure 1:
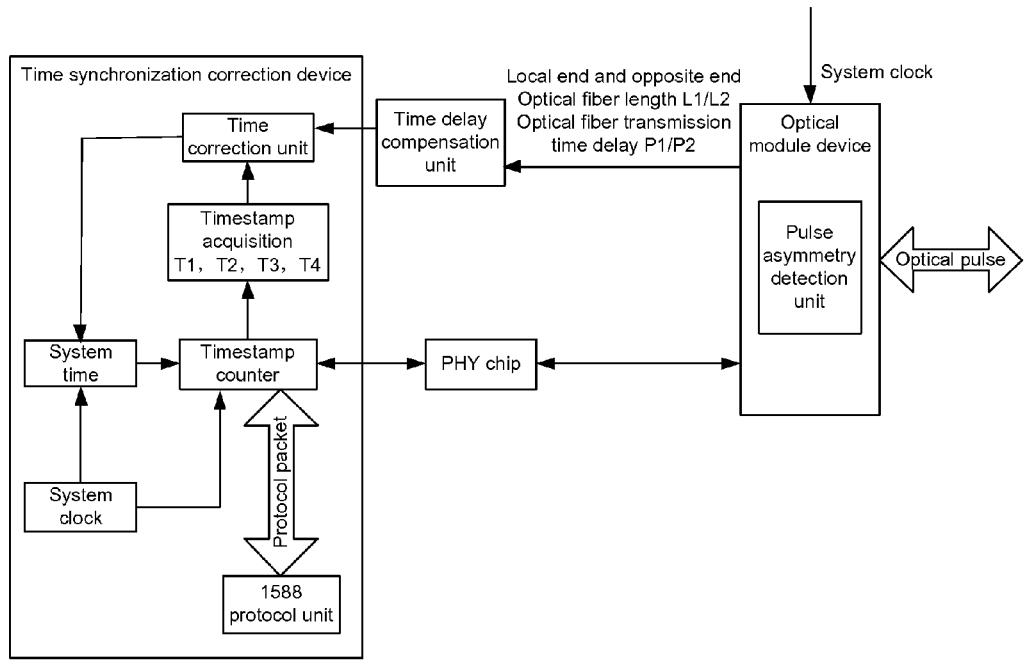
FIG. 1 is a structure diagram of a system according to an embodiment of the disclosure.

In the embodiment of the disclosure, a pulse transmission time delay difference and an asymmetry distance of bidirectional optical fibres between network elements on two sides are detected, an asymmetry time delay of the bidirectional optical fibres is obtained according to the asymmetry distance of the bidirectional optical fibres and the pulse transmission time delay difference, and compensation is performed to correct system time to realize time synchronization for optical fibre asymmetry according to the asymmetry time delay of the bidirectional optical fibres.

The embodiments of the disclosure mainly include contents as follows.

A synchronization system for detecting asymmetry of optical fibres includes an optical module device integrated with a pulse asymmetry detection unit, a time delay compensation unit, a time synchronization correction device, a Physical (PHY) chip, wherein the optical module device in the system is newly added device; and the time delay compensation unit, the time synchronization correction device and the PHY chip are existing equipment, and are newly added device function-based extended applications.

Each optical module device includes a pair of BOSAs, and the receiving/sending optical ports in the optical module device are connected with the BOSAs which have a receiving/sending function.

The optical module device is configured to realize the offline detection of the asymmetry of the bidirectional optical fibres. When network elements, i.e. a master optical module device and a slave optical module device, at two ends of time synchronization, are connected through optical fibres, pulse asymmetry detection is automatically started. When the offline detection of the asymmetry of the bidirectional optical fibres is started, the master and slave optical module devices enter an asymmetry detection state, the master optical module device switches the two BOSAs into a sending module, and the slave optical module device switches the two BOSAs into a receiving mode.

A pulse generator in the master optical module device generates a pulse, and simultaneously sends the pulse from the two BOSAs.

The master optical module device sends the optical pulse from the two BOSAs, so that the pulse detector in the slave optical module device detects two pulses respectively, a counter is started for counting after the first pulse is detected, and when the second pulse is detected, the counter is stopped, and the pulse transmission time delay difference and a sequence of the two pulses are output.

The master and slave optical module devices are restored into a normal working state.

The pulse transmission time delay different recorded by the counter is notified to the time delay compensation unit.

The time delay compensation unit calculates an asymmetry time delay of the bidirectional optical fibres according to the asymmetry distance of the bidirectional optical fibres and the pulse transmission time delay difference of the bidirectional optical fibres, and feeds back the asymmetry time delay of the bidirectional optical fibres to the time synchronization correction device through the time delay compensation unit.

The time synchronization correction device performs 1588 time transmission asymmetry compensation to correct system time according to the asymmetry time delay of the bidirectional optical fibres, and specifically, a time correction unit in the time synchronization correction device calculates a time compensation value to correct the system time to realize 1588 time and frequency synchronization according to the asymmetry time delay of the bidirectional optical fibres and timestamps T1, T2, T3 and T4 of a 1588 protocol packet.

A synchronization method for detecting asymmetry of optical fibres includes: off line detecting a pulse transmission time delay difference and an asymmetry distance of bidirectional optical fibres between network elements on two sides; obtaining an asymmetry time delay of the bidirectional optical fibres according to the asymmetry distance of the bidirectional optical fibres and the pulse transmission time delay difference; and obtaining a time compensation value to correct system time to realize time synchronization for optical fibre asymmetry according to the asymmetry time delay of the bidirectional optical fibres and a timestamp of a protocol packet.

Here, the step of off line detecting the asymmetry distance of the bidirectional optical fibres and the pulse transmission time delay difference between the network elements on the two sides specifically includes: finishing detection negotiation between the network elements on the two sides, and switching service data processing in a normal working state into pulse signal processing in an asymmetry detection state, and switching a pair of BOSAs of the network element on one side into a sending mode to send two pulse signals, and switching a pair of BOSAs of the network element on the other side into a receiving mode to obtain the pulse transmission time delay difference and the asymmetry distance of the bidirectional optical fibres according to the two received pulse signals.

Here, the method further includes terminating the detection between the network elements on the two sides, and switching pulse signal processing in the asymmetry detection state back into service data processing in the normal working state.

From the above, by the embodiments of the disclosure, the pulse transmission time delay difference and the asymmetry distance of the bidirectional optical fibres between the network elements (master and slave optical module devices)

on the two sides are detected off line, thereby obtaining the asymmetry time delay of the bidirectional optical fibre; the system time is corrected by performing 1588 time transmission optical fibre asymmetry compensation according to the time delay, so that time synchronization accuracy is improved while a response is given as quick as possible, and a requirement of a wireless TDD service on time synchronization is met. Asymmetry detection in the embodiment of the disclosure has the advantages of short detection time, high reliability and simplicity in execution.

The implementation of the technical solutions is further described below with reference to the drawings in detail.

FIG. 1 is a structure diagram of a time synchronization system according to an embodiment of the disclosure. The system includes an optical module device integrated with a pulse asymmetry detection unit, a time delay compensation unit, a time synchronization correction device, a PHY chip, wherein the optical module device in the system is a newly added device; and the time delay compensation unit, the time synchronization correction device and the PHY chip are existing equipment, and extended applications based on newly added device functions, and are not repeated. The optical module device and a process of negotiated detection between master and slave optical module devices are described below, and will not be repeated here.

For the time synchronization correction device, as shown in FIG. 1, a protocol module in the time synchronization correction device generates a protocol packet according to 1588 protocol, the protocol packet is sent and received through a time correction unit, and the time correction unit records a timestamp according to the category of the 1588 packet, that is, at a master device end, a timestamp of a Sync packet is recorded as T1 and a timestamp of a Delay_Resp packet is recorded as T4, while at a slave device end, the timestamp of the Sync packet is recorded as T1 and T2, a timestamp of a Delay_req packet is recorded as T3, and a timestamp of the Delay_resp packet is recorded as T4, and T1, T2, T3 and T4 are acquired through a timestamp counter, and are reported to the time correction unit. Reference time of the time correction unit is system time, and a reference clock is a system clock. A sending and receiving path of the 1588 packet containing the timestamp passes through the PHY chip and the optical module devices. The pulse asymmetry detection unit feeds back an asymmetry detection result to the time correction unit. The time correction unit calculates a time compensation value to correct the system time to realize 1588 time synchronization according to an asymmetry difference value of bidirectional optical fibres and the timestamps T1, T2, T3 and T4 of the 1588 protocol.

Figure 2:
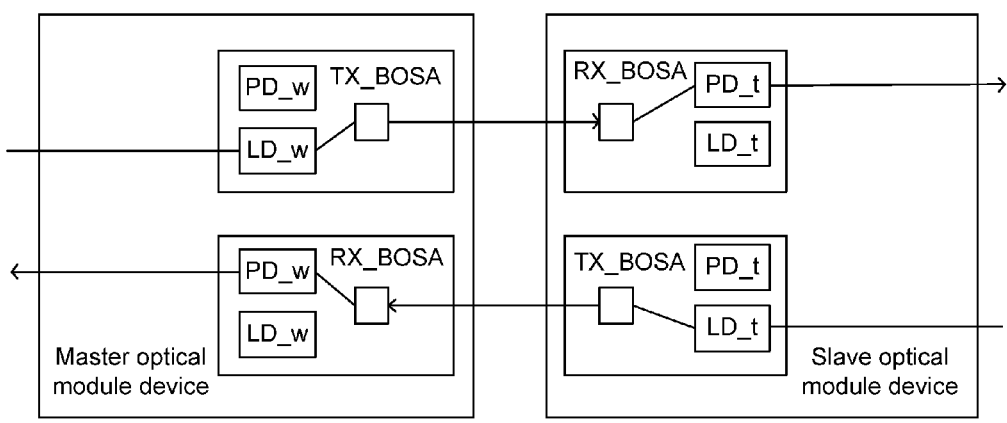
FIG. 2 is a connection diagram of master and slave optical module devices according to an embodiment of the disclosure.

FIG. 2 is a connection diagram of master and slave optical module devices in a normal working state according to an embodiment of the disclosure. The master optical module device and the slave optical module device are designed to have the same interior structure so as to be changed over according to actual needs during a specific application. Each of the master optical module device and the slave optical module device includes a semiconductor laser diode (LD), serving as a laser emission component, and further includes a photoelectron diode (PD), serving as an optical receiving component. A pair of LD and PD is integrated in each BOSA, wherein RX_BOSA serves as a receiving device in the normal working state during normal communication between when the master optical module device and the slave optical module device, and TX_BOSA serves as a sending device in the normal working state during normal communication between the master optical module device and the slave optical module device. The master optical module device and the slave optical module device have the same structure, and can be the master/slave of each other. In a negotiated detection process shown in FIG. 5, the optical module device in master device is set into a master optical module device mode, and the optical module device in slave device is set into a slave optical module device mode. The master device is an asymmetry detection initiation device, and the slave device is a detection result acquisition device.

Figure 3:
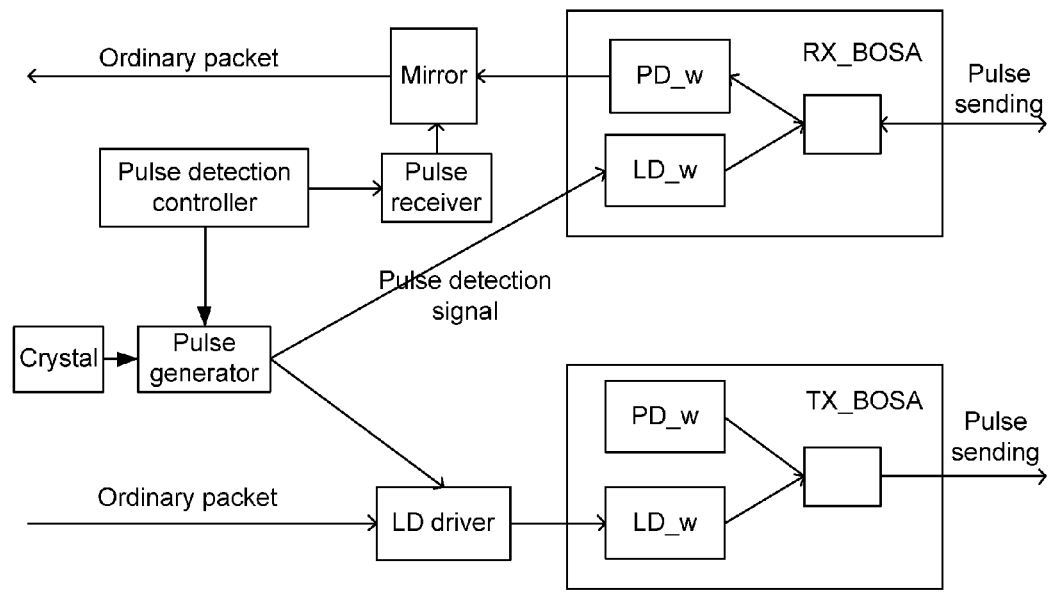
FIG. 3 is a structure diagram of a master optical module device according to an embodiment of the disclosure.
Figure 4:
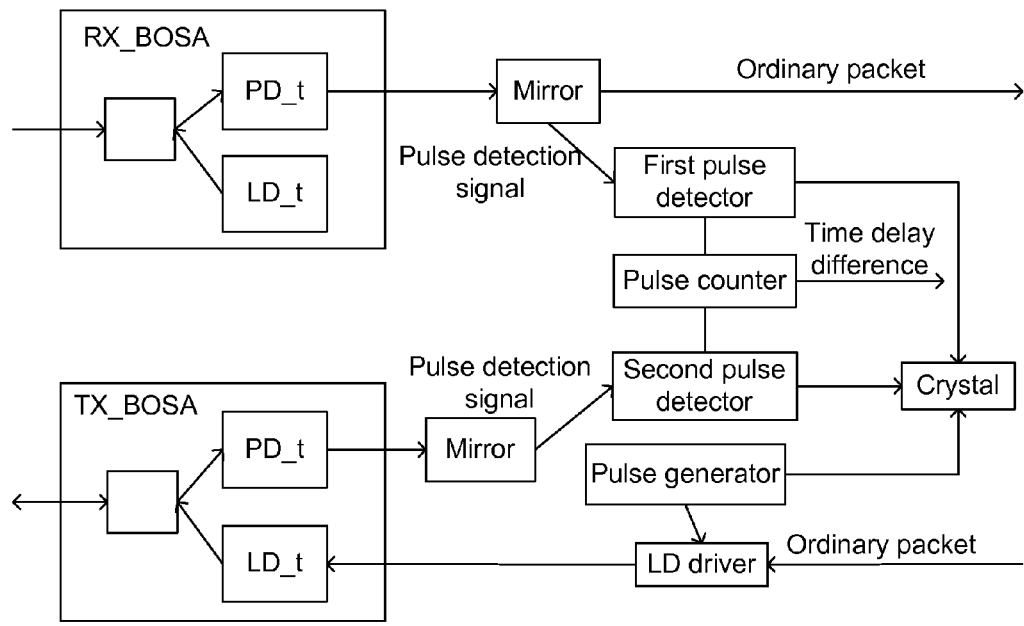
FIG. 4 is a structure diagram of a slave optical module device according to an embodiment of the disclosure.

FIG. 3 and FIG. 4 are structure diagrams of a master optical module device and a slave optical module device according to an embodiment of the disclosure respectively. The master optical module device and the slave optical module device have the same structure, and can be a master/slave of each other. Any optical module device includes a pair of BOSAs, of which one is a RX_BOSA configured for receiving in a normal working state and the other is a TX_BOSA configured for sending in the normal working state; and each optical module device further includes devices such as a pulse generator, a pulse receiver, a pulse detection controller, a mirror, a crystal and an LD driver. Functions of each device and a process of interaction between the devices in FIG. 3 and FIG. 4 are specifically described with reference to states in the embodiment of the disclosure below, and will not be repeated here.

There are two states, i.e. the normal working state and an asymmetry detection state, in the embodiment of the disclosure.

First, under the normal working state:

the master and slave optical module devices are in the normal working state, as shown in FIG. 3, PD_w in RX_BOSA of the master optical module device receives service data, and uploads the service data to the master device, and LD_w in TX_BOSA of the master optical module device is driven by a data link of the master device to send the service data of the master device to the slave optical module device; and PD_w in RX_BOSA of the slave optical module device receives the service data, and LD_w in TX_BOSA of the slave optical module device sends the service data to the slave device.

Second, the asymmetry detection state further includes the following conditions:

1. asymmetry detection negotiation

When offline detection of asymmetry of bidirectional optical fibres is started, the master device sends an asymmetry detection starting packet through TX_BOSA, and the slave device receives the asymmetry detection starting packet, and periodically sends an asymmetry detection response packet to the master device.

2. The slave device starts asymmetry detection

As shown in FIG. 4, the receiver PD_t in TX_BOSA of the slave optical module device of the slave device gets ready to receive a pulse signal, and sends the pulse signal to a pulse detector; and the receiver PD_w in RX_BOSA of the slave optical module device also gets ready to receive a pulse signal, and mirrors the pulse signal to the pulse detector.

LD_w of the slave optical module device does not send the service data of the slave device any longer. The pulse detector is started to detect the signals received by PD_w of RX_BOSA and PD_t of TX_BOSA.

After handover, the slave optical module device cannot send the asymmetry detection response packet to the master device.

3. The master device starts asymmetry detection.

The master device receives the asymmetry detection response packet from the slave device, and enters a state of waiting for determination. Both BOSAs in the slave optical module device of the slave device are regulated into the receiving mode, and at this time, the service data is not processed, that is, the slave optical module device cannot send the asymmetry detection response packet to the master device, therefore, if the master device cannot receive the asymmetry detection response packet from the slave device within a certain time to further determine the master device has finished negotiation with the slave device, then the master optical module device is switched into a distance measurement mode.

As shown in FIG. 3, the pulse generator of the master optical module device is connected to LD_t in RX_BOSA, and can send a pulse signal, and the LD driver of LD_w in TX_BOSA is changed to send the signal of the pulse generator only and not to send the service data transmitted by the master device.

The master optical module device switches both BOSAs into the sending mode. Correspondingly, the slave optical module device switches both BOSAs into the receiving mode.

4. The master and slave optical module devices measure the distance.

The pulse generator of the master optical module device generates an optical pulse, and simultaneously sends pulse signals to RX_BOSA and the LD driver of TX_BOSA of the master optical module device. After the pulse signals are sent, monitoring on PD_w in RX_BOSA of the master optical module device is started to detect a response signal from the opposite end.

The pulse detector in the slave optical module device is started to receive the pulse signals received by the PDs of RX_BOSA and TX_BOSA respectively.

As shown in FIG. 4, when the first pulse signal is received, the pulse counter is started for counting by virtue of a clock of more than 125 Mhz, and the stability of the crystal is lower than 50 ppm.

When the second pulse signal is sent, the pulse counter is stopped, and a pulse transmission time delay difference and an arrival sequence of the two pulse signals are output.

As shown in FIG. 4, the pulse generator of the slave optical module device generates a pulse, and sends an asymmetry detection termination pulse through the LD driver of TX_BOSA, a normal packet receiving and sending mode is restored after a certain time delay, and the LD driver of TX_BOSA is switched to a data sending link of the slave device, and reports the detected pulse transmission time delay difference and the arrival sequence of the two pulse signals.

If the first or second pulse signal is not received within the certain time, TX_BOSA of the slave optical module device is also restored into an LD sending mode to send the pulse signal, RX_BOSA is kept in a PD receiving mode, and TX_BOSA of the slave optical module device sends a detection termination pulse signal, is restored into the normal packet receiving and sending mode after a certain time delay, and reports an asymmetry detection failure.

The slave optical module device processes a service data receiving and sending signal of the slave device, and does not process the pulse signals of the pulse generator and the pulse receiver in the optical module device any longer.

After RX_BOSA of the master optical module device of the master device receives the detection termination pulse signal from the opposite end, the master device is restored to normally receive and send service data, and the driver of TX_BOSA is switched to a data sending link of the master device.

The master optical module device processes a service data receiving and sending signal of the master device, and does not process the pulse signals of the pulse generator and the pulse receiver in the optical module device any longer.

If the detection termination pulse signal sent by the slave device is not received within a certain time, the master device is restored to normally receive and send the service data after the time delay exceeds the limit.

The master optical module device processes a service data receiving and sending signal of the master device, and does not process the pulse signals of the pulse generator and the pulse receiver in the optical module device any longer.

5. Asymmetry detection is ended

The master device receives the asymmetry detection response packet from the slave device again, and determines that asymmetry detection is ended. An asymmetry detection termination packet is sent, and the slave device receives the asymmetry detection termination packet, learns that the master device is normal, and terminates the sending of the asymmetry detection response packet to terminate asymmetry detection. After asymmetry detection is finished, normal communication between the master and slave devices in the normal working state is restored.

Method embodiment: negotiated detection is performed for time synchronization between the master and slave optical module devices.

Figure 5:
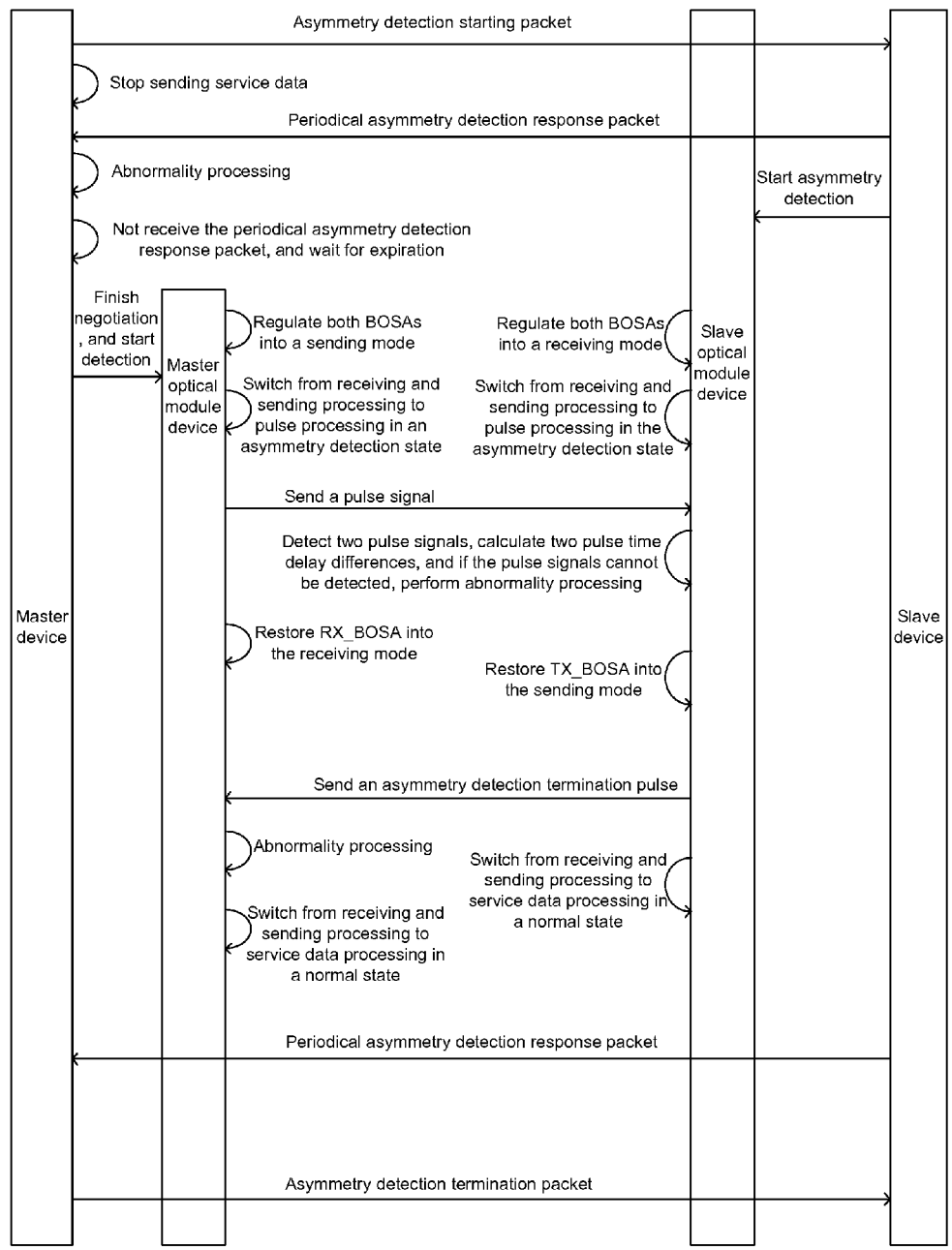
FIG. 5 is a diagram of negotiated detection for realizing time synchronization between master and slave optical module devices according to a method embodiment of the disclosure.

FIG. 5 is a diagram of negotiated detection for realizing time synchronization between master and slave optical module devices according to a method embodiment of the disclosure, and as shown in FIG. 5, the method includes the following contents:

a: a master device sends an asymmetry detection starting packet, and a slave device periodically sends an asymmetry detection response packet for negotiation. After negotiation, a normal working state is switched into an asymmetry detection state, and a master optical module device of the master device stops sending service data to a slave optical module device of the slave device;

b: when the slave device starts asymmetry detection, two BOSAs (TX_BOSA and RX_BOSA) in the slave optical module device of the slave device are regulated into a receiving mode; at this time, the service data is not processed, and receiving and sending processing is switched into pulse processing in the asymmetry detection state;

c: when the master device starts asymmetry detection, two BOSAs (TX_BOSA and RX_BOSA) in the master optical module device of the master device are regulated into a sending mode; at this time, the service data is not processed, and receiving and sending processing is switched into pulse processing in the asymmetry detection state;

d: the master optical module device generates an optical pulse, and sends a pulse signal to the slave optical module device;

e: the slave optical module device detects two pulse signals, and calculates a pulse transmission time delay difference; the slave optical module device is switched from the asymmetry detection state into the normal working state, and is restored into a normal service data receiving and sending mode, that is, TX_BOSA is restored into the sending mode;

f: the slave optical module device sends a detection termination pulse signal to the master optical module device;

g: the master optical module device receives the detection termination pulse signal, and the master optical module device is switched from the asymmetry detection state into the normal working state, and is restored into the normal service data receiving and sending mode, that is, RX_BOSA is restored into the receiving mode; and h: the master optical module device and the slave optical module device are switched into service data processing in the normal working state.

The above are only the preferred embodiments of the disclosure and not intended to limit the scope of protection of the disclosure.

INDUSTRIAL PRACTICABILITY

According to the embodiments of the disclosure, the pulse transmission time delay difference and the asymmetry distance of the bidirectional optical fibres between the network elements on the two sides are detected, the asymmetry time delay of the bidirectional optical fibres is obtained according to the asymmetry distance of the bidirectional optical fibres and the pulse transmission time delay difference, and the asymmetry time delay of the bidirectional optical fibres is fed back to the time synchronization correction device for processing through the time delay compensation unit. Therefore, by the embodiments of the disclosure, detection time can be reduced, execution complexity can be lowered, response can be quickened, and detection accuracy can be improved.

What is claimed is:

1. A master optical module device for detecting asymmetry of bidirectional optical fibres, comprising a pair of Bidirectional Optical Sub-Assemblies (BOSA), the master optical module device being configured to, after a master device and a slave device exchange request and response and agree to start asymmetry detection, set each of the pair of BOSAs to a sending mode to simultaneously send a pulse signal to a slave optical module device for detecting an asymmetry distance of bidirectional optical fibres and a pulse transmission time delay difference of the bidirectional optical fibres monitor a signal returned by the slave optical module device, and terminate the asymmetry detection after receiving an asymmetry detection termination pulse signal sent by the slave optical module device,
   wherein the pair of BOSAs are a RX_BOSA and a TX_BOSA, both configured to switch, in response to start of the asymmetry detection, from a normal working state to an asymmetry detection state,
   wherein the RX_BOSA is configured to receive service data in the normal working state, and send the pulse signal generated by a pulse generator in the asymmetry detection state,
   wherein the TX_BOSA is configured to send service data in the normal working state, and send the pulse signal generated by the pulse generator in the asymmetry detection state,
   wherein each of the pair of BOSAs comprises a semiconductor Laser Diode (LD) and a Photoelectron Detector (PD);
   wherein the master optical module device further comprises: the pulse generator connected to the LD of the RX_BOSA: and an LD driver connected to the pulse generator,
   wherein the pulse generator is configured to generate the pulse signal and send the pulse signal to the LD of the RX_BOSA and to the LD driver,
   wherein the LD driver is configured to drive the LD of the TX_BOSA to send the pulse signal generated by the pulse generator.

2. The master optical module device according to claim 1, wherein the PD of the RX_BOSA is configured to, after the pulse signal is sent to the slave optical module device, start monitoring the signal returned by the slave optical module device.

3. The master optical module device according to claim 2, further comprising a pulse detection controller and a pulse receiver, wherein
   the pulse detection controller is connected to the pulse generator, and is configured to control pulse signal sending by the pulse generator; and
   the pulse receiver is configured to receive the signal returned by the slave optical module device.

4. The master optical module device according to claim 1, further comprising a pulse detection controller and a pulse receiver, wherein
   the pulse detection controller is connected to the pulse generator, and is configured to control pulse signal sending by the pulse generator; and
   the pulse receiver is configured to receive the signal returned by the slave optical module device.

5. A system for detecting asymmetry of bidirectional optical fibres, comprising the master optical module device according to claim 1 and the slave optical module device.

6. The system according to claim 5, wherein the PD of the RX_BOSA is configured to, after the pulse signal is sent to the slave optical module device, start monitoring the signal returned by the slave optical module device.

7. The system according to claim 6, wherein the master optical module device further comprises a pulse detection controller and a pulse receiver,
   wherein the pulse detection controller is connected to the pulse generator, and is configured to control pulse signal sending by the pulse generator,
   wherein the pulse receiver is configured to receive the signal returned by the slave optical module device.

8. The system according to claim 5, wherein the master optical module device further comprises a pulse detection controller and a pulse receiver,
   wherein the pulse detection controller is connected to the pulse generator, and is configured to control pulse signal sending by the pulse generator,
   wherein the pulse receiver is configured to receive the signal returned by the slave optical module device.

9. The system according to claim 5, wherein the slave optical module device comprises a slave pair of Bidirectional Optical Sub-Assemblies (BOSA), the slave optical module device being configured to, after the master device and the slave device exchange the request and response and agree to start the asymmetry detection, set each of the slave pair of BOSAs to a receiving mode to receive the two pulse signals sent by the master optical module device, detect the asymmetry distance of the bidirectional optical fibres and the pulse transmission time delay difference of the bidirectional optical fibres according to the two pulse signals, output the asymmetry distance and the pulse transmission time delay difference, and send the asymmetry detection termination pulse signal to the master optical module device to terminate the asymmetry detection,
   wherein the slave pair of BOSAs are a slave RX_BOSA and a slave TX_BOSA, both configured to switch, in response to start of the asymmetry detection, from the normal working state to the asymmetry detection state,
   wherein the slave RX_BOSA is configured to receive service data in the normal working state, and receive a RX_BOSA pulse signal in the asymmetry detection state, wherein the slave TX_BOSA is configured to send service data in the normal working state, and receive a TX_BOSA pulse signal in the asymmetry detection state, wherein each of the slave pair of BOSAs comprises a Laser Diode (LD) and a Photoelectron Detector (PD), wherein the slave optical module device further comprises a first pulse detector, a second pulse detector, and a pulse counter connected to both the first pulse detector and the second pulse detector, wherein the PD of the slave RX_BOSA is configured to receive the RX_BOSA pulse signal and send the RX_BOSA pulse signal to the pulse counter via the first pulse detector, wherein the PD of the slave TX_BOSA is configured to receive the TX_BOSA pulse signal and send the TX_BOSA pulse signal to the pulse counter via the second pulse detector, wherein the pulse counter is configured to start counting upon receiving a first pulse signal, stop counting upon receiving a second pulse signal, and output the pulse transmission time delay difference.

10. The system according to claim 9, wherein the slave optical module device further comprises a slave pulse generator and a slave LD driver connected to the slave pulse generator, wherein the slave pulse generator is configured to generate the asymmetry detection termination pulse signal when the asymmetry detection is terminated, and send the asymmetry detection termination pulse signal to the slave LD driver; and the slave LD driver is configured to drive the LD of the TX_BOSA to send the asymmetry detection termination pulse signal generated by the slave pulse generator.

11. A slave optical module device for detecting asymmetry of bidirectional optical fibres, comprising a pair of Bidirectional Optical Sub-Assemblies (BOSA), the slave optical module device being configured to, after a master device and a slave device exchange request and response and agree to start asymmetry detection, set each of the pair of BOSAs to a receiving mode to receive two pulse signals sent by a master optical module device, detect an asymmetry distance of bidirectional optical fibres and a pulse transmission time delay difference of the bidirectional optical fibres according to the two pulse signals, output the asymmetry distance and the pulse transmission time delay difference, and send an asymmetry detection termination pulse signal to the master optical module device to terminate the asymmetry detection, wherein the pair of BOSAs are a RX_BOSA and a TX_BOSA, both configured to switch, in response to start of the asymmetry detection, from a normal working state to an asymmetry detection state, wherein the RX_BOSA is configured to receive service data in the normal working state, and receive a RX_BOSA pulse signal in the asymmetry detection state, wherein the TX_BOSA is configured to send service data in the normal working state, and receive a TX_BOSA pulse signal in the asymmetry detection state, wherein each of the pair of BOSAs comprises a Laser Diode (LD) and a Photoelectron Detector (PD), wherein the slave optical module device further comprises a first pulse detector, a second pulse detector, and a pulse counter connected to both the first pulse detector and the second pulse detector, wherein the PD of the RX_BOSA is configured to receive the RX_BOSA pulse signal and send the RX_BOSA pulse signal to the pulse counter via the first pulse detector, wherein the PD of the TX_BOSA is configured to receive the TX_BOSA pulse signal and send the TX_BOSA pulse signal to the pulse counter via the second pulse detector, wherein the pulse counter is configured to start counting upon receiving a first pulse signal, stop counting upon receiving a second pulse signal, and output the pulse transmission time delay difference.

12. The slave optical module device according to claim 11, further comprising a pulse generator and an LD driver connected to the pulse generator, wherein the pulse generator is configured to generate the asymmetry detection termination pulse signal when the asymmetry detection is terminated, and send the asymmetry detection termination pulse signal to the LD driver; and the LD driver is configured to drive the LD of the TX_BOSA to send the asymmetry detection termination pulse signal generated by the pulse generator.

13. A method for detecting asymmetry of bidirectional optical fibres, comprising:

setting, by a master optical module device after a master device and a slave device exchange request and response and agree to start asymmetry detection, each of a pair of Bidirectional Optical Sub-Assemblies (BOSA) of the master optical module device to a sending mode to simultaneously send a pulse signal to a slave optical module device for detecting an asymmetry distance of bidirectional optical fibres and a pulse transmission time delay difference of the bidirectional optical fibres, monitoring a signal returned by the slave optical module device, and terminating the asymmetry detection after receiving an asymmetry detection termination pulse signal sent by the slave optical module device, wherein the pair of BOSAs are a RX_BOSA and a TX_BOSA, both of which switch, in response to start of the asymmetry detection, from a normal working state to an asymmetry detection state, wherein the RX_BOSA receives service data in the normal working state, and sends the pulse signal generated by a pulse generator in the asymmetry detection state, wherein the TX_BOSA sends service data in the normal working state, and sends the pulse signal generated by the pulse generator in the asymmetry detection state, wherein each of the pair of BOSAs comprises a semiconductor Laser Diode (LD) and a Photoelectron Detector (PD);

wherein the master optical module device further comprises: the pulse generator connected to the LD of the RX_BOSA; and an LD driver connected to the pulse generator, wherein the pulse generator generates the pulse signal and sends the pulse signal to the LD of the RX_BOSA and to the LD driver, wherein the LD driver drives the LD of the TX_BOSA to send the pulse signal generated by the pulse generator.

14. The method according to claim 13, wherein after the pulse signal is sent to the slave optical module device, the PD of the RX_BOSA starts monitoring the signal returned by the slave optical module device.

15. The method according to claim 14, wherein the master optical module device controls pulse signal sending by the pulse generator, and receives the signal returned by the slave optical module device.

16. The method according to claim 13, wherein the master optical module device controls pulse signal sending by the pulse generator, and receives the signal returned by the slave optical module device.

17. A method for detecting asymmetry of bidirectional optical fibres, comprising:
    setting, by a slave optical module device after a master device and a slave device exchange request and response and agree to start asymmetry detection, each of a pair of Bidirectional Optical Sub-Assemblies (BOSA) of the slave optical module device to a receiving mode to receive two pulse signals sent by a master optical module device, detecting an asymmetry distance of bidirectional optical fibres and a pulse transmission time delay difference of the bidirectional optical fibres according to the two pulse signals, outputting the asymmetry distance and the pulse transmission time delay difference, and sending an asymmetry detection termination pulse signal to the master optical module device to terminate the asymmetry detection,
    wherein the pair of BOSAs are a RX_BOSA and a TX_BOSA, both of which switch, in response to start of the asymmetry detection, from a normal working state to an asymmetry detection state,
    wherein the RX_BOSA receives service data in the normal working state, and receives a RX_BOSA pulse signal in the asymmetry detection state,
    wherein the TX_BOSA sends service data in the normal working state, and receives a TX_BOSA pulse signal in the asymmetry detection state,
    wherein each of the pair of BOSAs comprises a Laser Diode (LD) and a Photoelectron Detector (PD),
    wherein the slave optical module device further comprises a first pulse detector, a second pulse detector, and a pulse counter connected to both the first pulse detector and the second pulse detector,
    wherein the PD of the RX_BOSA receives the RX_BOSA pulse signal and sends the RX_BOSA pulse signal to the pulse counter via the first pulse detector,
    wherein the PD of the TX_BOSA receives the TX_BOSA pulse signal and sends the TX_BOSA pulse signal to the pulse counter via the second pulse detector,
    wherein the pulse counter starts counting upon receiving a first pulse signal, stops counting upon receiving a second pulse signal, and outputs the pulse transmission time delay difference.

18. The method according to claim 17, wherein the slave optical module device generates the asymmetry detection termination pulse signal when the asymmetry detection is terminated, and drives the LD of the TX_BOSA to send the asymmetry detection termination pulse signal generated by the pulse generator.

* * * * *